US012288215B2

(12) United States Patent
Gatchalian et al.

(10) Patent No.: US 12,288,215 B2
(45) Date of Patent: Apr. 29, 2025

(54) MULTIDIMENSIONAL TRANSACTION PATTERN TRACKING AND PREDICTION

(71) Applicant: Bank of America Corporation, Charlotte, NC (US)

(72) Inventors: Gilbert Gatchalian, Union, NJ (US); Kevin A. Delson, Woodland Hills, CA (US); Pratap Dande, St. Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 18/072,918

(22) Filed: Dec. 1, 2022

(65) Prior Publication Data

US 2024/0185248 A1  Jun. 6, 2024

(51) Int. Cl.
*G06Q 20/40* (2012.01)
*G06Q 20/10* (2012.01)

(52) U.S. Cl.
CPC ....... *G06Q 20/4016* (2013.01); *G06Q 20/102* (2013.01); *G06Q 20/4014* (2013.01)

(58) Field of Classification Search
CPC ............. G06Q 20/4016; G06Q 20/102; G06Q 20/4014
See application file for complete search history.

(56) References Cited

U.S. PATENT DOCUMENTS

| | | | | |
|---|---|---|---|---|
| 11,276,023 | B1* | 3/2022 | Butler | G06N 20/00 |
| 11,551,228 | B2* | 1/2023 | Goodsitt | G06Q 20/12 |
| 2010/0274691 | A1* | 10/2010 | Hammad | G06Q 20/3221 |
| | | | | 705/30 |
| 2017/0169500 | A1* | 6/2017 | Merz | G06Q 30/0631 |
| 2017/0300911 | A1* | 10/2017 | Alnajem | G06Q 20/4014 |
| 2019/0311367 | A1* | 10/2019 | Reddy | G06Q 20/4016 |
| 2019/0378010 | A1* | 12/2019 | Morris | G06F 16/288 |
| 2020/0005192 | A1* | 1/2020 | Kumar | G06N 5/025 |
| 2020/0143374 | A1* | 5/2020 | Pitz | G06Q 20/4016 |
| 2020/0145400 | A1* | 5/2020 | Ryan | G06Q 20/10 |
| 2022/0114593 | A1* | 4/2022 | Johnson | G06F 18/24133 |
| 2023/0012019 | A1* | 1/2023 | Newsom, III | G06Q 20/401 |

(Continued)

*Primary Examiner* — Peter D Nolan
*Assistant Examiner* — Matthew Cobb
(74) *Attorney, Agent, or Firm* — Weiss & Arons LLP

(57) ABSTRACT

Systems and methods for multidimensional transaction pattern tracking and prediction are provided. A method includes detecting a series of transactions associated with a remote user device and generating a multidimensional transactional profile. Generating the multidimensional transactional profile may involve a first ML model generating a first score representing a first dimension, and a second ML model generating a second score representing a second dimension. The method also includes selecting weightings for the scores, and combining the weighted scores to create the multidimensional transactional profile. The method also includes generating a list of recommended transactional activities and a list of flagged transactional activities, transmitting the list of recommended transactional activities to the remote user device, and detecting additional transactions originating from the account associated with the remote user device. In response to one of the transactions being from the flagged list, the method includes triggering an alert.

16 Claims, 5 Drawing Sheets

(56) References Cited

U.S. PATENT DOCUMENTS

| | | | | |
|---|---|---|---|---|
| 2023/0196367 A1* | 6/2023 | Zhuge | ............... | G06Q 20/382 |
| | | | | 705/39 |
| 2023/0316284 A1* | 10/2023 | Kramme | ............... | G06Q 20/34 |
| | | | | 705/44 |

* cited by examiner

MULTIDIMENSIONAL TRANSACTION PATTERN TRACKING AND PREDICTION

FIELD OF TECHNOLOGY

Aspects of the disclosure relate to digital systems. Specifically, aspects of the disclosure relate to digital systems for transaction pattern tracking and prediction.

BACKGROUND OF THE DISCLOSURE

Digital transactional systems are ubiquitous. Many users have digital transactional accounts and are logged in to a central digital transactional hub via remote digital devices.

The digital transactional systems facilitate a large number of digital transactions. Executing transactions over a digital transactional system provides many advantages. Advantages may relate to a reduction in the utilization of time and personnel. Advantages may also relate to safety and convenience.

However, digital transactional systems are susceptible to fraudulent activity. For example, a malicious actor may gain access to a digital payment instrument or to authenticating information, and may attempt to execute unauthorized transactions.

It would be desirable, therefore, to provide systems and methods for fraud detection in digital transactional systems.

SUMMARY OF THE DISCLOSURE

Aspects of the disclosure relate to a multidimensional transaction pattern tracking and prediction engine. The engine may include a central server in communication with a plurality of remote user devices. The central server may include a set of machine-learning (ML) models, a processor, and a non-transitory memory storing computer executable instructions. When run on the processor, the instructions may be configured to execute functions of the engine.

The engine may be configured to detect, for a remote user device from the plurality of remote user devices, a series of transactions originating from an account associated with the remote user device. The engine may be configured to generate, via the set of ML models and based on the detected series of transactions, a multidimensional transactional profile for the remote user device.

Generating the multidimensional transactional profile may include passing the detected series of transactions through a first ML model to generate a first score representing a first dimension. The first ML model may be trained to detect transactional patterns along the first dimension. Generating the multidimensional transactional profile may also include passing the detected series of transactions through a second ML model to generate a second score representing a second dimension. The second ML model may be trained to detect transactional patterns along the second dimension.

Generating the multidimensional transactional profile may also include selecting a first weighting for the first score and a second weighting for the second score. Generating the multidimensional transactional profile may also include combining the weighted first score and the weighted second score to create the multidimensional transactional profile.

The engine may be configured to generate, based on the multidimensional transactional profile, a list of recommended transactional activities and a list of flagged transactional activities. The engine may be configured to transmit the list of recommended transactional activities to the remote user device.

The engine may be configured to detect additional transactions originating from the account associated with the remote user device. In response to one of the additional transactions being from the list of flagged transactional activities, the engine may be configured to trigger an alert at the central server.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
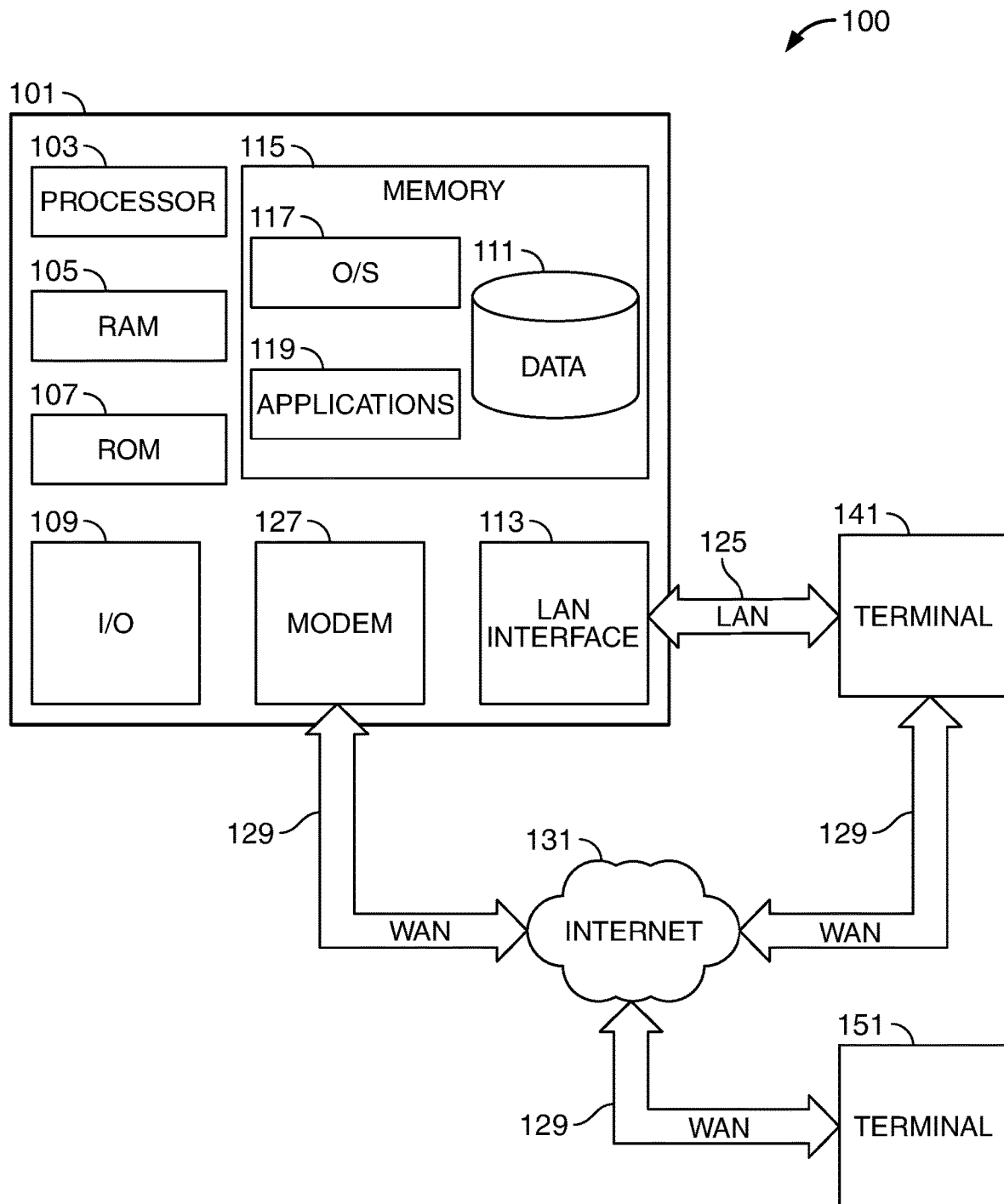
FIG. 1 shows an illustrative system in accordance with principles of the disclosure.

Aspects of the disclosure relate to systems and methods for multidimensional transaction pattern tracking and prediction. Systems may include an engine. Methods may be executed by the engine. Configurations of the engine may correspond to steps of the methods.

The engine may include a central server in communication with a plurality of remote user devices. The remote user devices may, for example, include laptops, desktops, tablets, smart phones, smart watches, or other suitable computing devices. The remote user devices may provide access for a user to an online transactional account or digital payment instrument.

The central server may include a set of machine-learning (ML) models, a processor, and/or a non-transitory memory storing computer executable instructions. When run on the processor, the instructions may be configured to provide system functions and execute method steps.

The engine may be configured to detect, for one of the remote user devices, a series of transactions. The series of transactions may originate from an account associated with the remote user device. For example, the remote user device may be a smart phone of a user logged in to an online portal of a financial institution. The online portal may include a digital wallet that may be usable for executing transactions. The online portal may also have access to other payment instruments, such as credit cards, that the user may use for executing transactions.

The engine may be configured to generate, via the set of ML models and based on the detected series of transactions, a multidimensional transactional profile for the remote user device. Each dimension may represent an aspect of a transaction. Dimensions may, for example, include geographical location, time, transactional amount, and transaction type. The multidimensional transactional profile may thereby represent a profile of a user's transactional tendencies across multiple aspects of the transactions. This may provide for a rich, directed, and accurate model for predicting and tracking future transactions.

Generating the multidimensional transactional profile may include passing the detected series of transactions through a first ML model to generate a first score representing a first dimension. The first ML model may be trained to detect transactional patterns along the first dimension.

Generating the multidimensional transactional profile may also include passing the detected series of transactions through a second ML model to generate a second score representing a second dimension. The second ML model may be trained to detect transactional patterns along the second dimension.

In some embodiments, the first and second dimensions may include two of a list of dimensions. The list may include geographical location, time, transactional amount, and transaction type. In certain embodiments, the engine may include more than two ML models, and additional models may represent additional dimensions from the aforementioned list. Additional models may represent any other suitable transactional dimension.

Generating the multidimensional transactional profile may also include selecting a first weighting for the first score and a second weighting for the second score. The selection may be performed automatically. For example, each dimension may have a preselected default weighting. In some embodiments, the weightings may be calculated by another ML model, based on historical transactional data.

In some embodiments, the first and the second weightings may be accessible on the remote user device. The remote user device may be provided with a mechanism for adjusting the first and the second weightings. Thus, a user may be able to adjust and customize the impact of each aspect of the multidimensional score. For example, if a user is not overly concerned about the amount of a transaction but is wary about the place a transaction occurs, the user may adjust the weighting so that the dimension representing amount has a smaller impact than the dimension representing geographic location.

Generating the multidimensional transactional profile may also include combining the weighted first score and the weighted second score to create the multidimensional transactional profile. The multidimensional transactional profile may thus be a numerical value that is a complex multifaceted representation of the user's transactional tendencies.

The engine may be configured to generate, based on the multidimensional transactional profile, a list of recommended transactional activities. The list of recommended transactional activities may be activities that conform with the multidimensional transactional profile.

The engine may also be configured to generate, based on the multidimensional transactional profile, a list of flagged transactional activities. The flagged transactional activities may be activities that conflict with the multidimensional transactional profile.

The engine may be configured to transmit the list of recommended transactional activities to the remote user device. For example, in one illustrative scenario, a multidimensional transactional profile may indicate that a user device has a high tendency of paying a certain bill on the first Monday of every month. This bill paying activity may be included in the list of recommended activities. The user device may, in certain embodiments, display a prompt recommending the activity. In the above example, the device may display a message on the first Monday of the month inquiring whether the user would like to pay the bill. The device may also provide a link through which the activity can be executed. For example, a link may be provided through which the user may execute a digital transaction to pay the bill.

The engine may be configured to detect additional transactions originating from the account associated with the remote user device. In response to one of the additional transactions being from the list of flagged transactional activities, the engine may be configured to trigger an alert at the central server.

In some embodiments, the alert may trigger transmission of an alert message to the remote user device. The alert message may include a text message and/or a phone call from a customer service associate. In certain embodiments, the alert may trigger a freezing of the account.

In some embodiments, the list of flagged transactional activities may be accessible on the remote user device. The remote user device may be provided with a mechanism for overriding the list of flagged transactional activities. Overriding the list of flagged transactional activities may include removing an activity from the list of flagged transactional activities. Providing the mechanism to override the flagged activities may provide a check on the fraud prevention system. Providing the mechanism to override the flagged activities may increase the accuracy and usability of the system by ensuring that a user is able to proactively signal that an activity is legitimate. For example, if the user plans to conduct an activity that is in the flagged list, that user may override the flag so that an alert will not be triggered when the user conducts the activity.

In some embodiments, the list of flagged transactional activities may include a list of transactional activities that are each associated with a probability of fraud that is higher than a predetermined threshold level of probability. The probability of fraud may include a probability of fraud to the account. The probability of fraud may also include a probability of fraud from the account.

In some embodiments, the list of recommended transactional activities may include a list of transactional activities that are in conformance with the multidimensional transactional profile. The list of recommended transactional activities may, for example, include a bill payment transaction.

In some embodiments, the engine may be further configured to perform the transaction pattern tracking and prediction for each of the plurality of remote user devices. In other words, for each device, the system may detect transactions, generate a multidimensional transactional profile, generate a list of recommended transactional activities and a list of flagged transactional activities, transmit the list of recommended transactional activities to the device, detect additional transactions, and, in response to one of the additional transactions being from the list of flagged transactional activities, trigger an alert at the central server.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to transaction pattern tracking and prediction.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
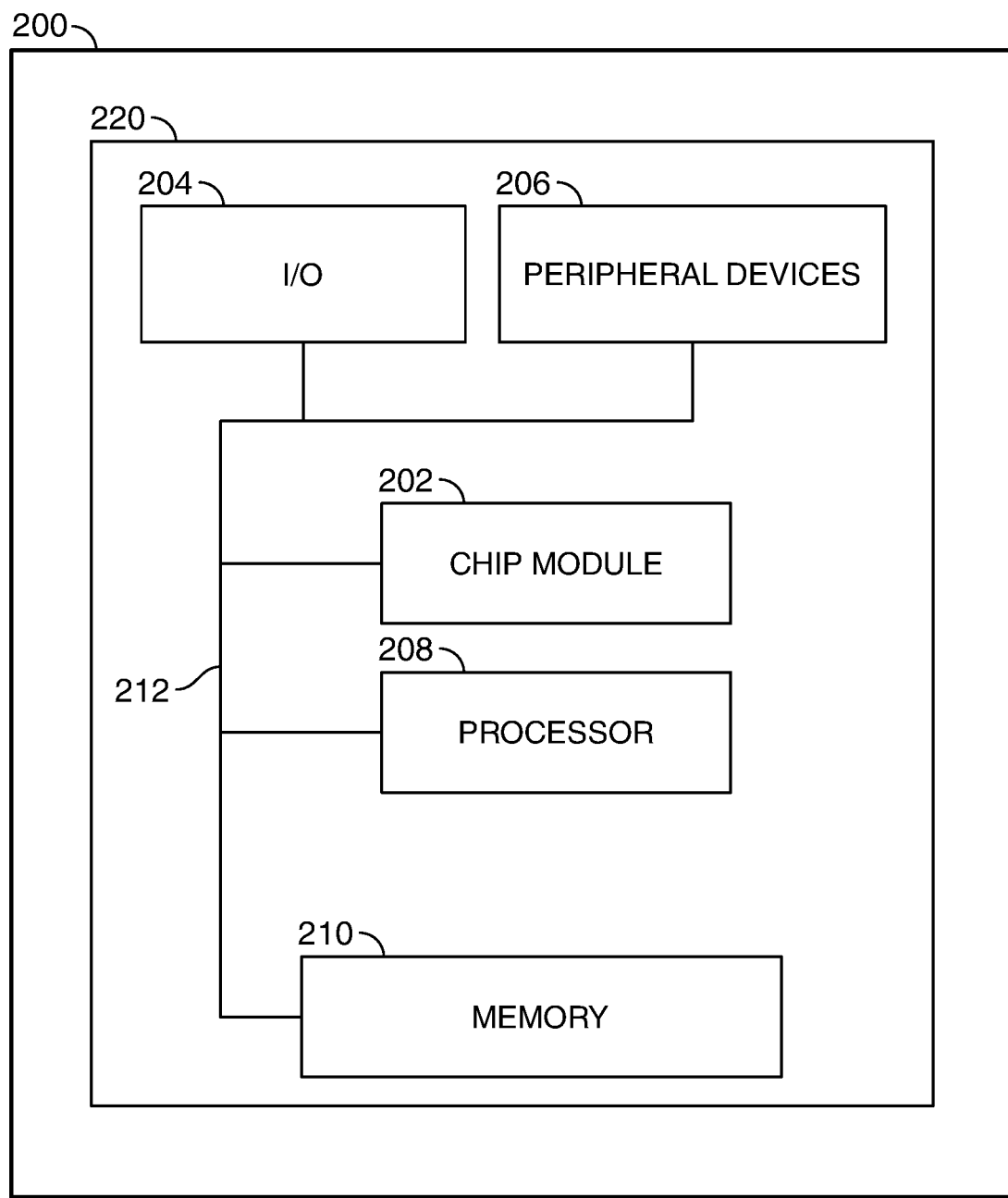
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
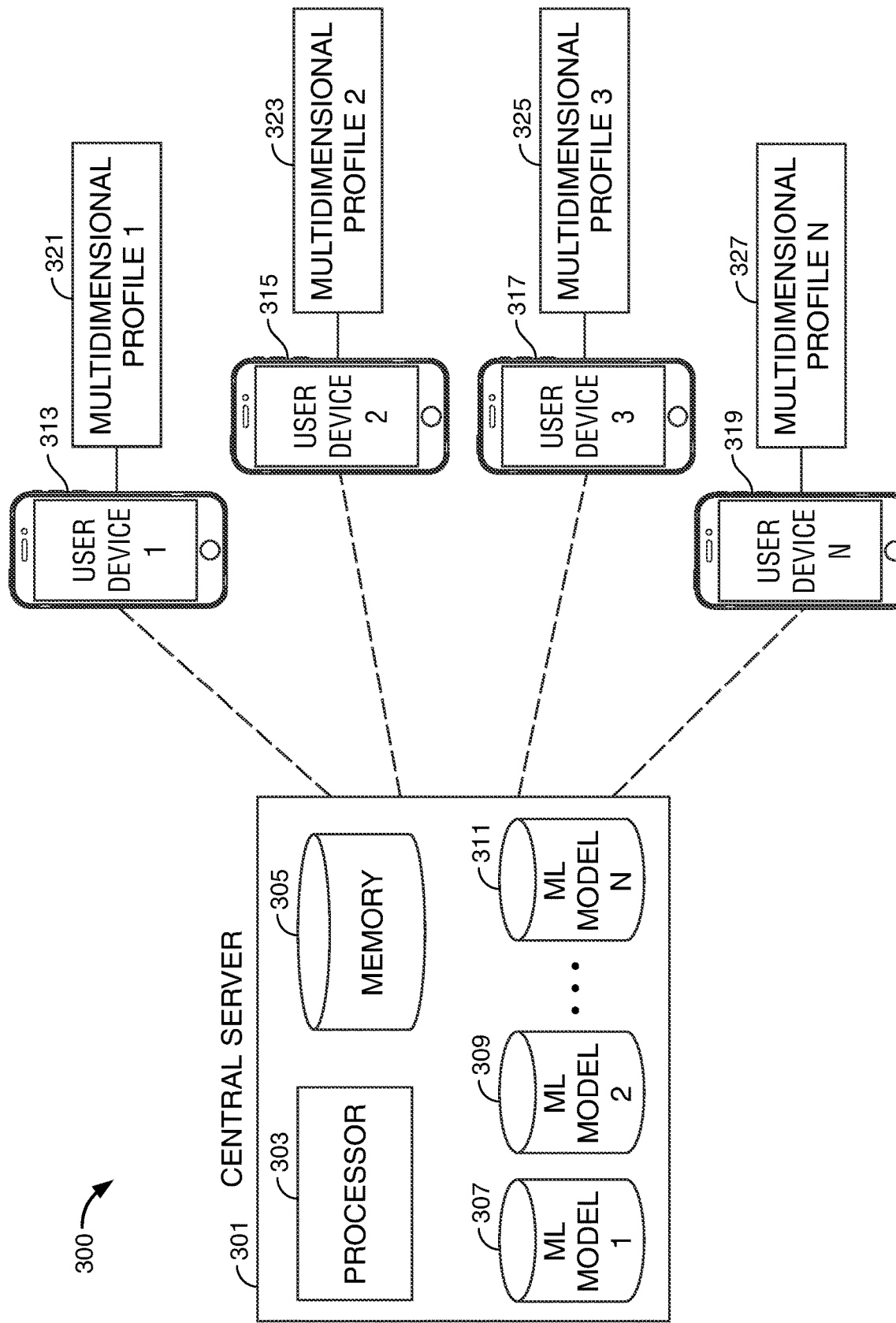
FIG. 3 shows an illustrative diagram in accordance with principles of the disclosure.

FIG. 3 shows illustrative diagram 300 in accordance with principles of the disclosure. Diagram 300 shows a system for multidimensional transaction pattern tracking and prediction. The system includes central server 301. Central server 301 includes processor 303, memory 305, and a series of machine-learning (ML) models. The series of ML models includes ML model 1 (307), ML model 2 (309), through ML model N (311). Each ML model may represent a different transaction aspect or dimension. Central server 301 is shown in communication with multiple user devices (313-319). The series of ML models in central server 301 may generate a multidimensional profile for each of the multiple user devices (321-327).

Figure 4:
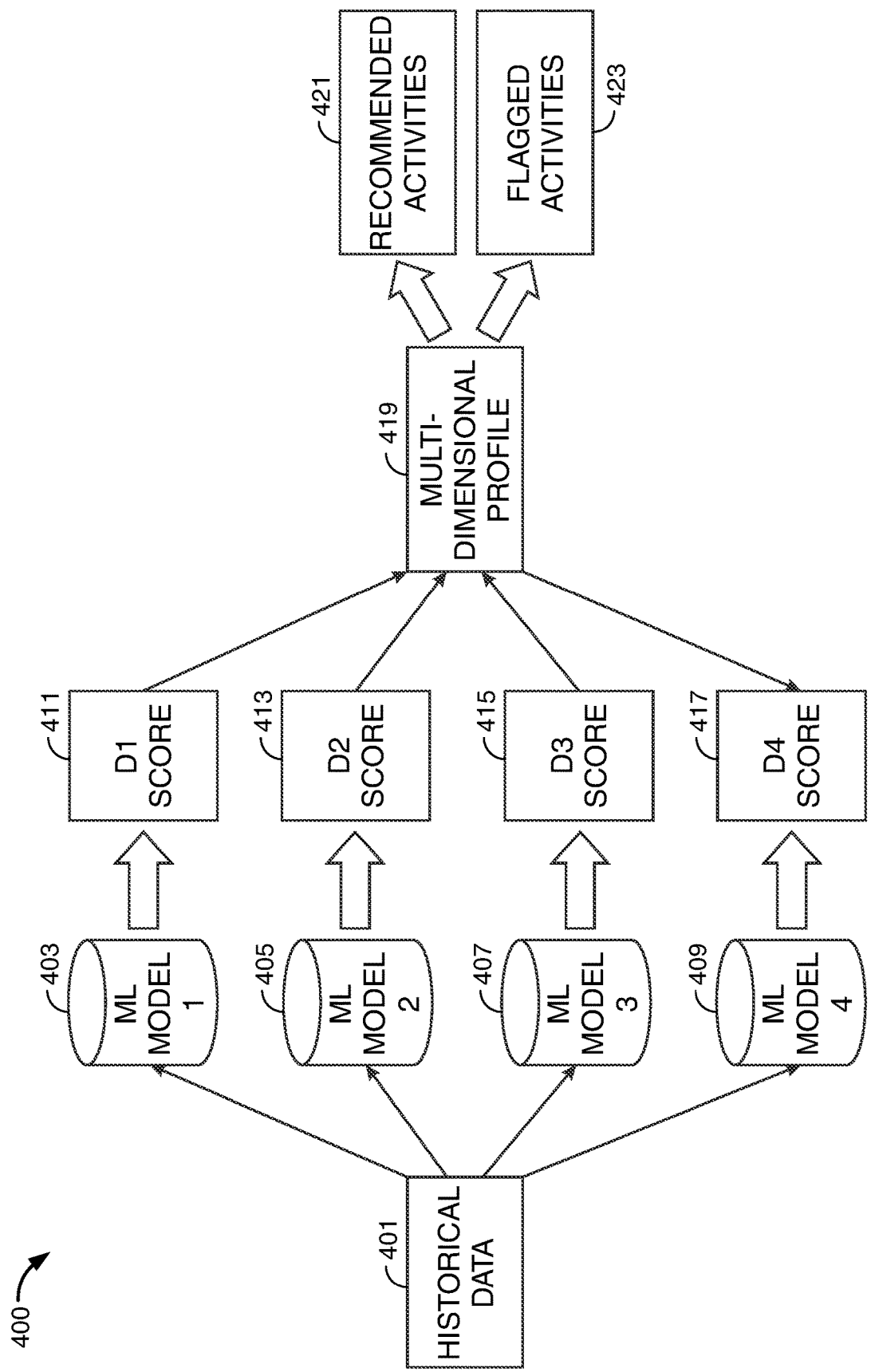
FIG. 4 shows another illustrative diagram in accordance with principles of the disclosure.

FIG. 4 shows illustrative diagram 400 in accordance with principles of the disclosure. Diagram 400 shows an aspect of the disclosed multidimensional transaction pattern tracking and prediction system. The system gathers historical transactional data 401. Transactional data 401 is fed into ML models (403-409). Each of ML models (403-409) generates a score (411-417) representing its respective dimension. The scores (411-417) are combined into multidimensional profile 419 according to the methods described herein. Based on multidimensional profile 419, the system generates recommended activities 421 and flagged activities 423.

Figure 5:
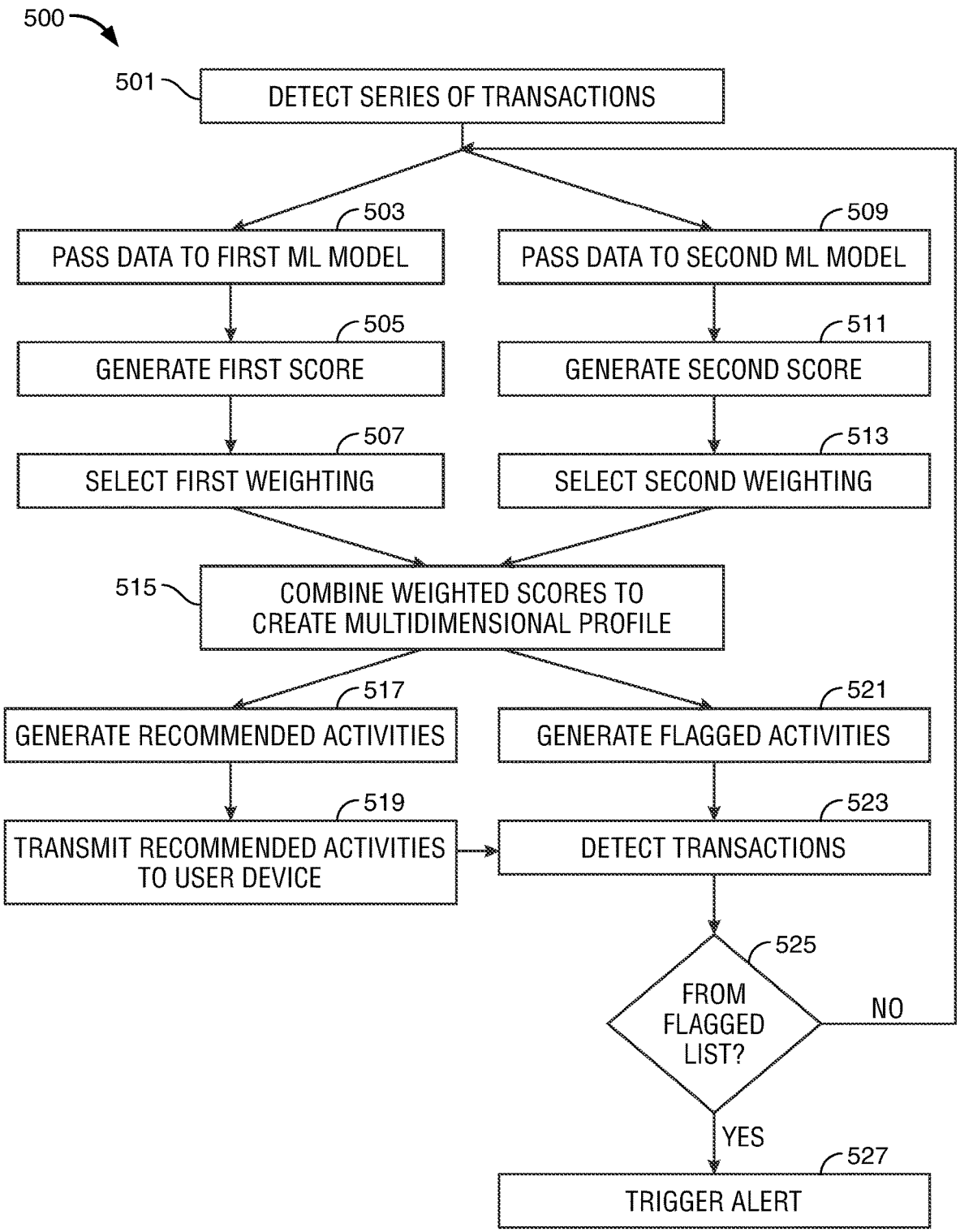
FIG. 5 shows an illustrative flowchart in accordance with principles of the disclosure.

FIG. 5 shows illustrative flowchart 500 in accordance with principles of the disclosure. Flowchart 500 shows steps of a process for multidimensional transaction pattern tracking and prediction. At step 501, the process includes detecting a series of transactions associated with a user device. At step 503, the process includes passing the transactional data to a first ML model representing a first dimension, generating a first score at step 505, and selecting a first weighting at step 507. At step 509, the process includes passing the transactional data to a second ML model representing a second dimension, generating a second score at step 511, and selecting a second weighting at step 513.

At step 515, the process includes combining the weighted scores to create a multidimensional profile. At step 517, the process includes generating recommended activities based on the profile. At step 519, the process includes transmitting the recommended activities to the user device. At step 523, the process includes detecting transactions associated with the user device.

At step 525, the process includes querying whether any of the detected transactions are from the flagged list. If any transactions are from the flagged list at step 525, the process includes triggering an alert at step 527. If none of the transactions are from the flagged list at step 525, the process reverts to step 501 and proceeds with steps 503 and 509.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for multidimensional transaction pattern tracking and prediction are provided. Persons skilled in the art will appreciate that the present invention can be practiced by other than the described embodiments, which are presented for purposes of illustration rather than of limitation, and that the present invention is limited only by the claims that follow.

What is claimed is:

1. A multidimensional transaction pattern tracking and prediction engine, said engine comprising:
 a central server in communication with a plurality of remote user devices, said central server comprising a set of machine-learning (ML) models, a processor, and a non-transitory memory storing computer executable instructions that, when run on the processor, are configured to:
 detect, for a remote user device from the plurality of remote user devices, a series of digital transactions originating from an online account associated with the remote user device;
 generate, via the set of ML models and based on the detected series of transactions, a multidimensional transactional profile for the remote user device, wherein generating the multidimensional transactional profile comprises:
 passing the detected series of transactions through a first ML model to generate a first score representing a first dimension, wherein the first ML model is trained to detect transactional patterns along the first dimension;
 passing the detected series of transactions through a second ML model to generate a second score representing a second dimension, wherein the second ML model is trained to detect transactional patterns along the second dimension;

selecting a first weighting for the first score and a second weighting for the second score; and combining the weighted first score and the weighted second score to create the multidimensional transactional profile;

generate, based on the multidimensional transactional profile, a list of recommended transactional activities and a list of flagged transactional activities;

transmit the list of recommended transactional activities to the remote user device;

detect additional transactions originating from the account associated with the remote user device; and in response to one of the additional transactions being from the list of flagged transactional activities, trigger an alert at the central server and freeze the account associated with the remote user device;

wherein:

the first and the second weightings are accessible on the remote user device; and the remote user device is provided with a mechanism for adjusting the first and the second weightings.

2. The engine of claim 1 wherein:

the list of flagged transactional activities is accessible on the remote user device; and the remote user device is provided with a mechanism for overriding the list of flagged transactional activities, wherein said overriding the list of flagged transactional activities comprises removing an activity from the list of flagged transactional activities.

3. The engine of claim 1 wherein the first and second dimensions comprise two of a list of dimensions that comprises geographical location, time, transactional amount, and transaction type.

4. The engine of claim 1 wherein the list of flagged transactional activities comprises a list of transactional activities that are each associated with a probability of fraud that is higher than a predetermined threshold level of probability, and wherein said probability of fraud comprises a probability of fraud to the account.

5. The engine of claim 4 wherein the probability of fraud also comprises a probability of fraud from the account.

6. The engine of claim 1 wherein the list of recommended transactional activities comprises a list of transactional activities that are in conformance with the multidimensional transactional profile, and the list of recommended transactional activities includes a bill payment transaction.

7. The engine of claim 1 wherein the alert triggers transmission of an alert message to the remote user device, said alert message comprising a text message and/or a phone call from a customer service associate.

8. The engine of claim 1 further configured to perform the transaction pattern tracking and prediction for each of the plurality of remote user devices.

9. A method for multidimensional transaction pattern tracking and prediction, said method comprising:

detecting, for a remote user device from a plurality of remote user devices, a series of digital transactions originating from an online account associated with the remote user device;

generating, via a set of ML models and based on the detected series of transactions, a multidimensional transactional profile for the remote user device, wherein generating the multidimensional transactional profile comprises:

passing the detected series of transactions through a first ML model to generate a first score representing a first dimension, wherein the first ML model is trained to detect transactional patterns along the first dimension;

passing the detected series of transactions through a second ML model to generate a second score representing a second dimension, wherein the second ML model is trained to detect transactional patterns along the second dimension;

selecting a first weighting for the first score and a second weighting for the second score; and combining the weighted first score and the weighted second score to create the multidimensional transactional profile;

generating, based on the multidimensional transactional profile, a list of recommended transactional activities and a list of flagged transactional activities;

transmitting the list of recommended transactional activities to the remote user device;

detecting additional transactions originating from the account associated with the remote user device; and in response to one of the additional transactions being from the list of flagged transactional activities, triggering an alert at a central server in communication with the plurality of remote user devices and freezing the account associated with the remote user device;

wherein:

the first and the second weightings are accessible on the remote user device; and the remote user device is provided with a mechanism for adjusting the first and the second weightings.

10. The method of claim 9 wherein:

the list of flagged transactional activities is accessible on the remote user device; and the remote user device is provided with a mechanism for overriding the list of flagged transactional activities, wherein said overriding the list of flagged transactional activities comprises removing an activity from the list of flagged transactional activities.

11. The method of claim 9 wherein the first and second dimensions comprise two of a list of dimensions that comprises geographical location, time, transactional amount, and transaction type.

12. The method of claim 9 wherein the list of flagged transactional activities comprises a list of transactional activities that are each associated with a probability of fraud that is higher than a predetermined threshold level of probability, and wherein said probability of fraud comprises a probability of fraud to the account.

13. The method of claim 12 wherein the probability of fraud also comprises a probability of fraud from the account.

14. The method of claim 9 wherein the list of recommended transactional activities comprises a list of transactional activities that are in conformance with the multidimensional transactional profile, and the list of recommended transactional activities includes a bill payment transaction.

15. The method of claim 9 wherein the alert triggers transmission of an alert message to the remote user device, said alert message comprising a text message and/or a phone call from a customer service associate.

16. The method of claim 9 further configured to perform the transaction pattern tracking and prediction for each of the plurality of remote user devices.

\* \* \* \* \*